United States Patent [19]

Basiulis

[11] 4,365,664
[45] Dec. 28, 1982

[54] OSMOTICALLY PUMPED HEAT PIPE WITH PASSIVE MIXING

[75] Inventor: Algerd Basiulis, Redondo Beach, Calif.

[73] Assignee: Hughes Aircraft Company, Culver City, Calif.

[21] Appl. No.: 198,748

[22] Filed: Oct. 20, 1980

[51] Int. Cl.³ .............................................. F28D 15/00
[52] U.S. Cl. ................................ 165/40; 165/104.22; 417/207
[58] Field of Search ........................... 165/104.22, 40; 417/207

[56] References Cited

U.S. PATENT DOCUMENTS

| | | | |
|---|---|---|---|
| 3,561,525 | 2/1971 | Baer | 165/104.22 |
| 3,677,337 | 7/1972 | Midolo | 165/104.22 |
| 4,300,624 | 11/1981 | Minning et al. | 165/104.22 X |

OTHER PUBLICATIONS

Minning et al., CP *Development of an Osmotic Heat Pipe* Presented at 3rd International Heat Pipe Conf. by AIAA, 5/22-24/78 (9 pp.).

*Primary Examiner*—Albert W. Davis
*Attorney, Agent, or Firm*—Lewis B. Sternfels; W. H. MacAllister; A. W. Karambelas

[57] ABSTRACT

Input and output tubes in an osmotically pumped heat pipe (10) are utilized to improve solvent-solute mixing and sweeping across a solvent-permeable membrane (46, 146, 246), to enable its operation in 0-g, 1-g and negative-g applications. Lean mixture solution flows through a path (16) of low pressure to an evaporator (14) where the solvent evaporates. Rich mixture solution from the evaporator then returns to the solvent-permeable membrane through a path (18) of higher pressure than the low pressure path to enable sweeping of the membrane and consequent increased mixing with the incoming condensed solvent.

15 Claims, 9 Drawing Figures

OSMOTICALLY PUMPED HEAT PIPE WITH PASSIVE MIXING

The government has rights to this invention pursuant to Contract No. F33615-77-C-3031 awarded by the Department of the Air Force.

CROSS-REFERENCE TO RELATED APPLICATIONS

The present invention is an improvement over that described in copending patent application, Ser. No. 106,984, filed Dec. 26, 1979 entitled "Passive Flow Mixing for Osmotic Pump Heat Pipes" by Algerd Basiulis and Charles P. Minning.

BACKGROUND OF THE INVENTION

1. Field of Invention

The present invention relates to osmotically pumped heat pipes and, in particular, to a means for obtaining maximized pumping efficiency therein under selected controlling environments.

2. Description of the Prior Art

In the invention described in above-identified patent application, Ser. No. 106,984 a convection current of rich solution was induced to pass across a solvent-permeable membrane to displace freshly pumped solvent from the membrane in order to maintain high pumping rates through the membrane. Such passive flow mixing is a decided advantage over mechanical pumping of working fluid, but is effective only within 1-g environments and not in other environments, such as in 0-g and negative-g environments, because it relies upon gravity-dependent density gradients to effect passive flow separation between concentrated and dilute solutions.

SUMMARY OF THE INVENTION

The present invention improves upon such passive flow mixing by enabling operation not only in 1-g but also in 0-g and negative-g environments by use of differential pressure pumping. Specifically, a closed pumping loop includes solution and solvent reservoirs separated in one part of the loop by an evaporator and a condensor, and in another part of the loop by solvent-permeable membrane material operating as an osmotic pump. The first part establishes a solvent vapor-liquid path in which the evaporator produces vapor from the solvent in the solution and the condensor removes heat from and transforms the vapor into a liquid for resupply of the solvent reservoir. A pair of solution paths in the other path respectively carry lean and rich mixtures of the solution in a secondary solution loop between the solution reservoir and the evaporator. A lower pressure drop in the lean mixture solution path and a higher pressure drop in the rich mixture solution path establishes a direction of solution flow across the membrane, which is independent of gravity. Different means are established in the lean and rich mixture paths to automatically or manually control the pressure differential.

Several advantages are derived therefrom. The osmotically pumped heat pipe is capable of operating in 0-g, 1-g, and negative-g applications, without depending upon gravity for mixing of solvent and solution, while maintaining high pumping rates. A high concentration gradient is maintained between the solvent and solvent-solute mixture sides of a solvent permeable membrane, by inducing concentrated solution flow past the membrane and thus to sweep solvent therefrom. Control of the solution flow is used to control the osmotic pumping.

Other aims and advantages as well as the more complete understanding of the present invention will appear from the following explanation of exemplary embodiments and the accompanying drawings thereof.

DETAILED DESCRIPTION OF THE INVENTION

Figure 1:
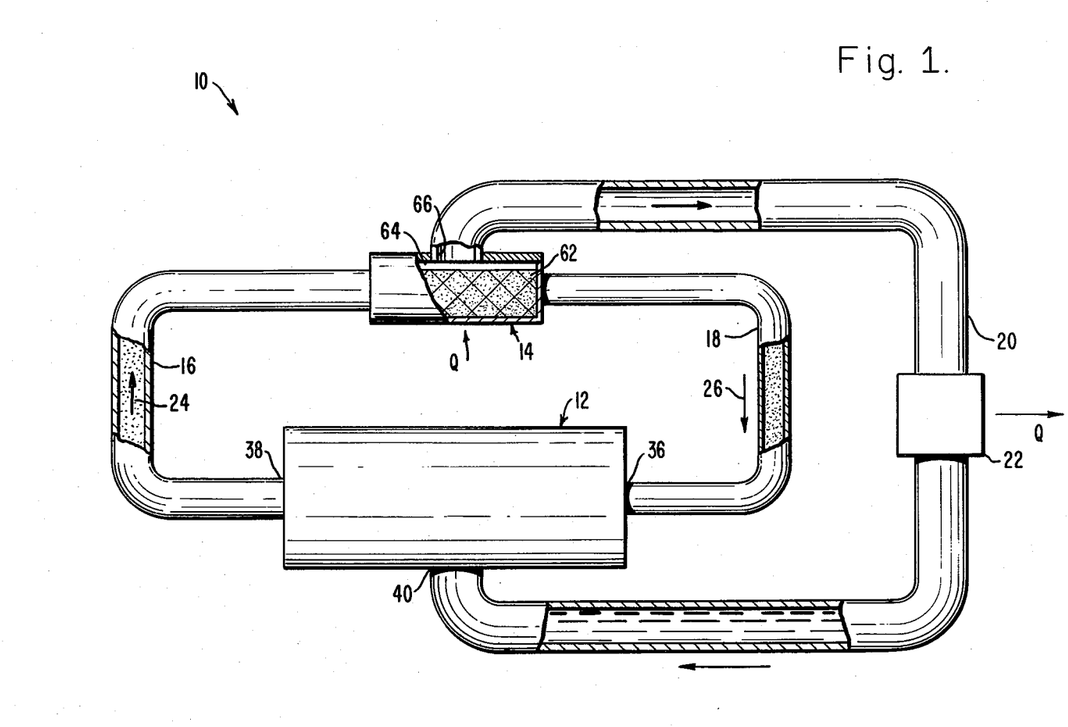
FIG. 1 is a general view of an osmotically pumped heat pipe constructed in accordance with the teachings of the present invention.

Referring to FIG. 1, an osmotically pumped heat pipe 10 includes an osmotic pump 12, an evaporator 14, respective lean and rich mixture solution paths 16 and 18 coupling the osmotic pump and the evaporator, a solvent vapor-liquid path 20 coupled between evaporator 14 and osmotic pump 12, and a condenser 22 placed within path 20 to convert the vapor therein into a liquid.

A prior osmotically pumped heat pipe system has an appearance which is similar to that depicted in FIG. 1, but without rich mixture solution path 18, and its operation parallels that of the present invention to the extent that a working fluid solution from a reservoir in osmotic pump 12 moves through path 16 to evaparator 14 where, through the application of heat as denoted by indicum Q, solvent evaporates from the solution and passes as a vapor through path 20 to condenser 22. Heat is given up in condenser 22 as denoted by indicum Q to transform the vapor solvent into a liquid which thence moves along the remainder of path 20 to a solvent reservoir in osmotic pump 12. In prior heat pipe installations, the concentration of the solution is greater in evaporator 14 with a decreasing concentration extending toward osmotic pump 12. In above-noted application Ser. No. 106,984, the rich solution was separated from the lean solution by concentric tubing.

In the present invention, similar separation is effected, not by concentric tubing, but by a separate rich mixture solution path 18. In order to obtain proper flow of the lean and rich mixture solutions, as denoted respectively by arrows 24 and 26, path 18 is caused to have a higher pressure drop with respect to path 16 to sweep the solution across the membrane in osmotic pump 12. The lean solution has a flow volume which is twice that of the rich solution.

Figure 2:
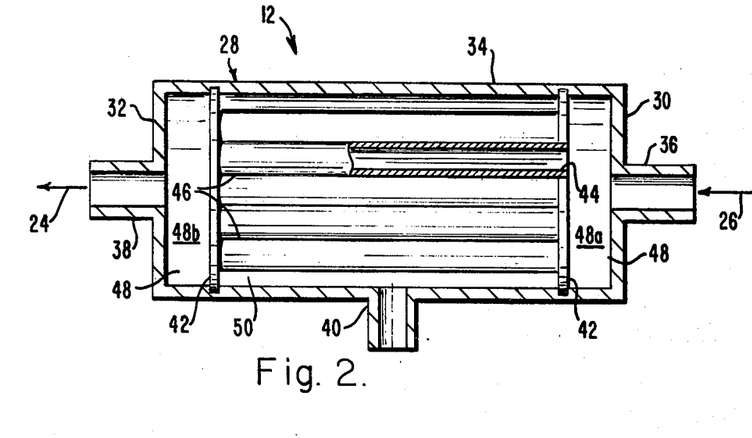
FIGS. 2–5 and 5a depict various means by which mixing of solvent and solution is effected through different arrangements of reservoirs therefor separated by solvent-permeable membrane material.

Several constructions of osmotic pumps 12, 112 and 212 are depicted in FIGS. 2–5, with FIG. 2 being configured particularly as the arrangement which is useful in FIG. 1. As shown in FIG. 2, osmotic pump 12 comprises an enclosure 28 having a pair of end walls 30 and 32 joined by a tubular wall 34. Rich mixture solution from path 18 enters enclosure 28 through an inlet 36 in end wall 30, and lean mixture solution exits enclosure 28 through an outlet 38 in end wall 32 for flow of the solution into path 16. Solvent from path 20 enters enclosure 28 through an inlet 40 centrally located within tubular wall 34.

A pair of spaced plates 42, each having openings 44 therein, support a plurality of tubes 46 formed of a solvent-permeable material. Thus, a combination of spaced plates 42 and end walls 30 and 32 form solution reservoir 48 comprising a pair of separated solution reservoirs 48a and 48b of equal size interconnected by tubes 46, and a centrally located solvent reservoir 50. Accordingly, rich mixture solution flows through inlet 36 and into the first half 48a of solution reservoir 48 for passage through solvent-permeable membrane tubes 46 and into the other half 48b of the solution reservoir for flow through outlet 38. As it traverses tubes 46, the solution is diluted by the solvent which enters its reservoir 50 through inlet 40 and passes through tubes 46 into their interiors. Thus, FIG. 2 depicts membrane material having a tubular configuration which is open to the solution reservoirs and which is placed within the solvent reservoir.

Figure 3:
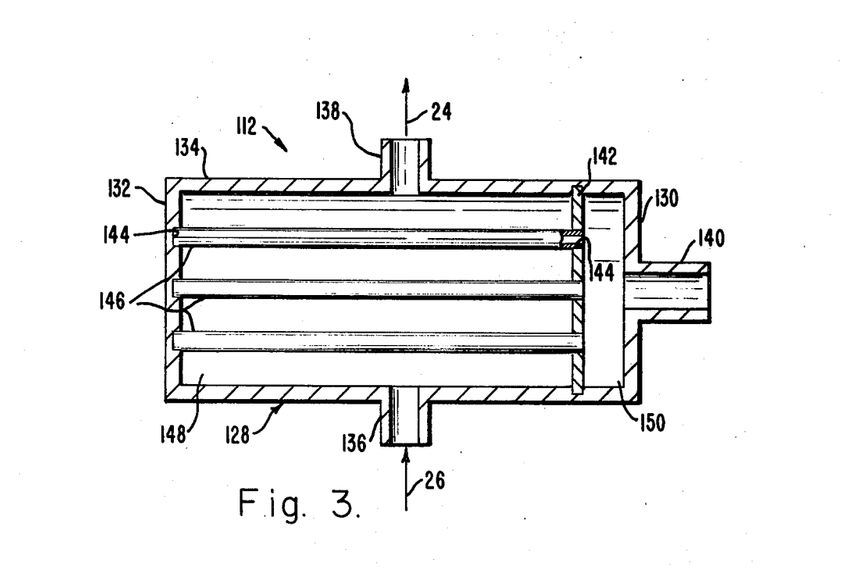

A reversed arrangement is illustrated in FIG. 3 in which tubes 146 of solvent-permeable membrane material carry solvent rather than solution, and are placed within a solution reservoir 148. In this modification, only a single plate 142 with openings 144 therein is used to support tubes 146 because only one end of enclosure 128 need be used to form a solvent reservoir 150, as well as solution reservoir 148. Therefore, an end wall 132, rather than a separate plate, may be provided with supporting recesses 144 therein to support one of the ends of tubes 146. As a result, solvent flows through inlet 140 in end wall 130 and into solvent reservoir 150, from which it flows into the interior of tubes 146 for movement through the walls thereof. Rich mixture solution enters into its reservoir 148 through inlet 136 in tubular wall 134 to sweep by the outer surfaces of the solvent-permeable membrane tubes for flow as a leaner solution out of outlet 138, also formed in tubular wall 134.

Figure 4:
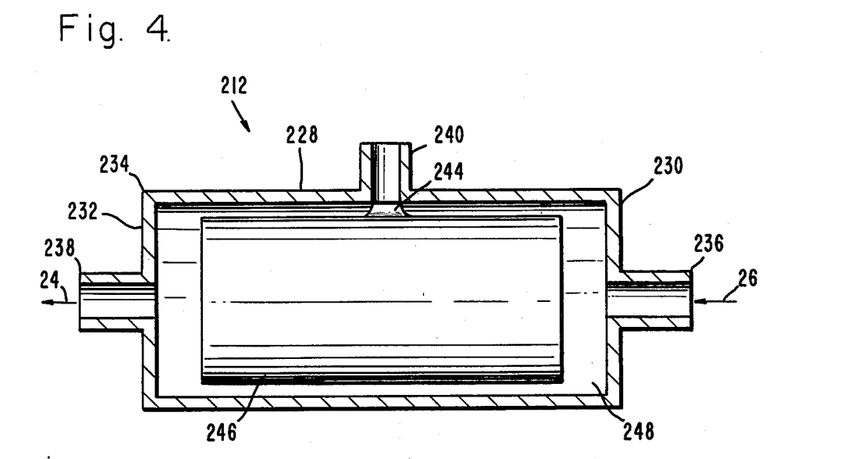
Figures 5, 5A:
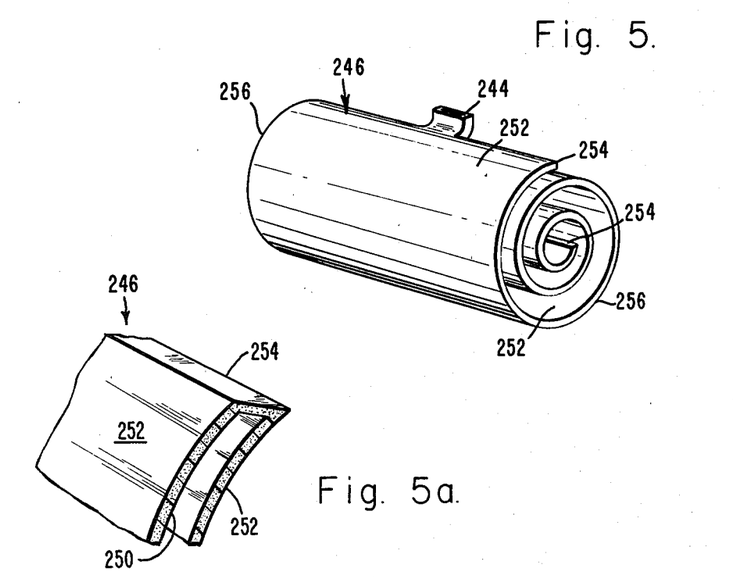

FIGS. 4, 5 and 5a depict a further modification in which the solvent-permeable membrane material is configured as a spirally wound closed space 246 which resides within a solution reservoir 248. As shown in FIG. 5 and in greater detail in FIG. 5a, closed space 246 defines a solvent reservoir 250 bounded by sheet-like walls 252, and walls 254 and side walls 256. The solvent reservoir communicates with solvent inlet 240 by means of an entry portion 244. Flow of solution as a rich mixture through inlet 236 moves axially through cylindrically formed, spirally configured closed space 246 and past sheet-like walls 252 in paths which are parallel to the cylindrical axis for passage out of enclosure 228 through outlet 238.

As stated before, movement of the lean and rich mixture solution in the direction of arrows 24 and 26 is obtained by providing a low pressure drop in lean mixture solution path 16 and a higher pressure drop in rich mixture solution path 18. Such differential pressures may be obtained, as shown in FIG. 1, by providing path 18 with a smaller internal diameter than path 16. Such an arrangement provides a fixed pressure differential which cannot be varied unless the internal dimensions of the paths are changed. When it is desired that the pressure differential be adjustable, one of several methods may be employed, as depicted in FIGS. 6–9.

Figure 6:
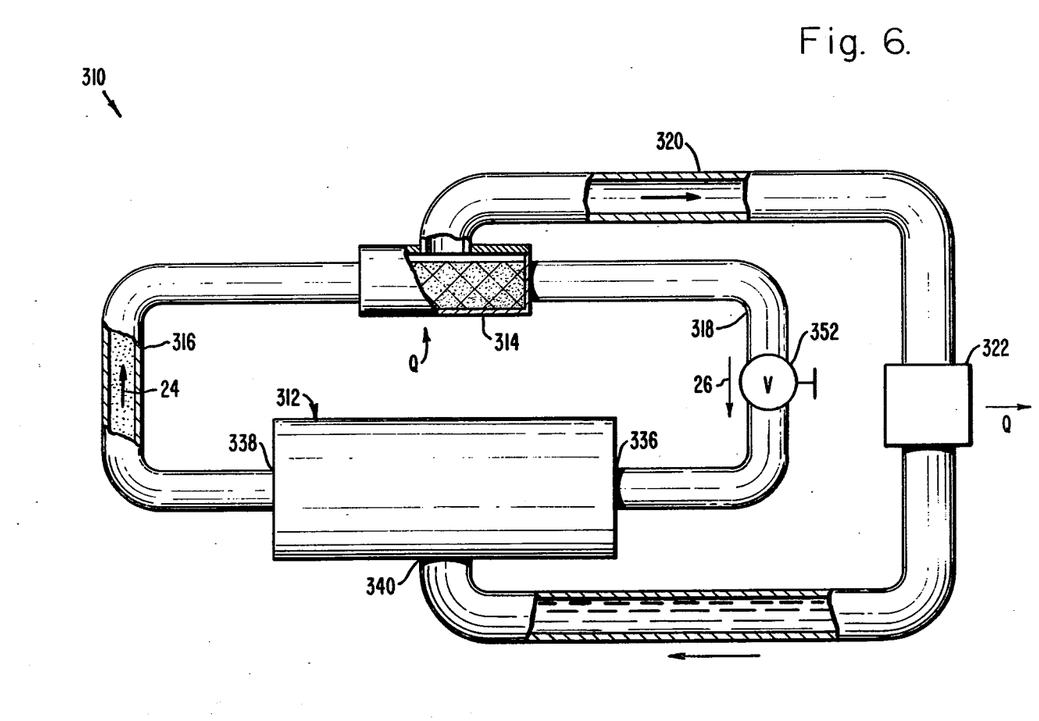
FIGS. 6–8 show modifications whereby different levels of pressure between paths for lean and rich mixtures of solution may be adjustably established to control the amount of mixing solvent into solution and, thereby, osmotic pumping.

In FIG. 6 flow control and the pressure of rich mixture solution passing through path 318 is controlled by a manually actuated valve 352. Closing of the valve will stop flow of the rich mixture solution which, in turn, prevents flow of solution past the solvent-permeable membrane material. When the solution no longer sweeps across the membrane, mixing of the solute with the solution is correspondingly reduced and solute collects on the solution side of the membrane. As the concentration gradient between the solute and solution sides of the membrane is reduced, osmotic pumping is also reduced. By controlling or modulating the opening of valve 352, the concentration gradient and, therefore, the pumping rate through the membrane may be controlled.

Figure 7:
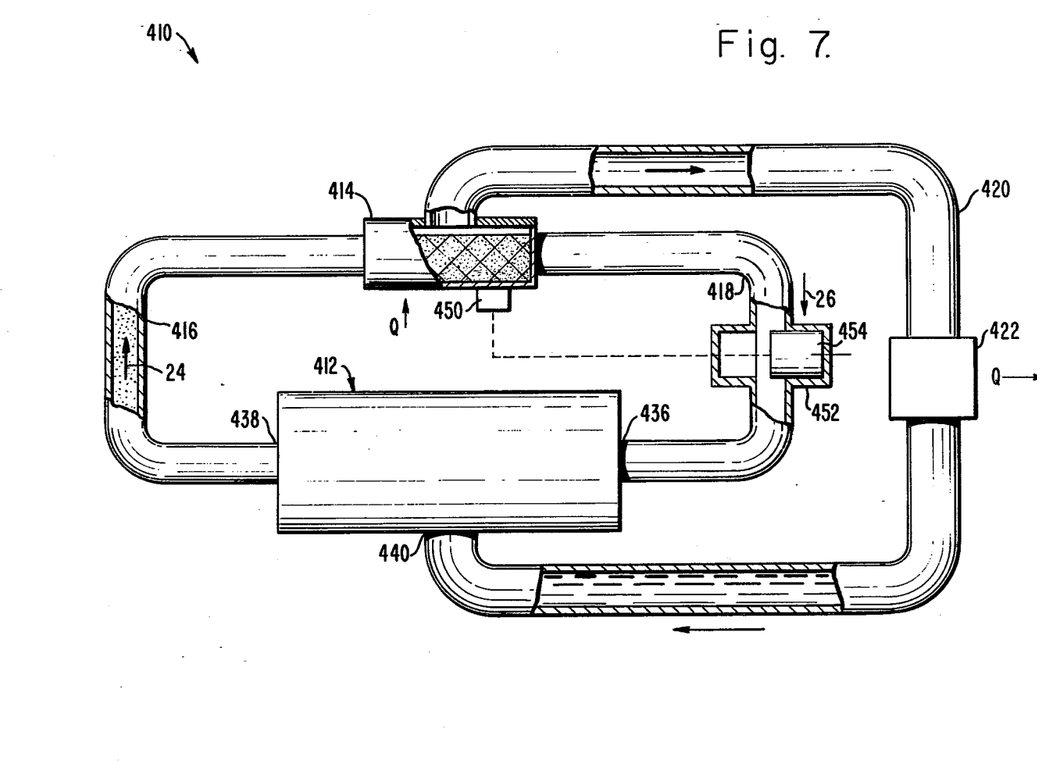
Figure 8:
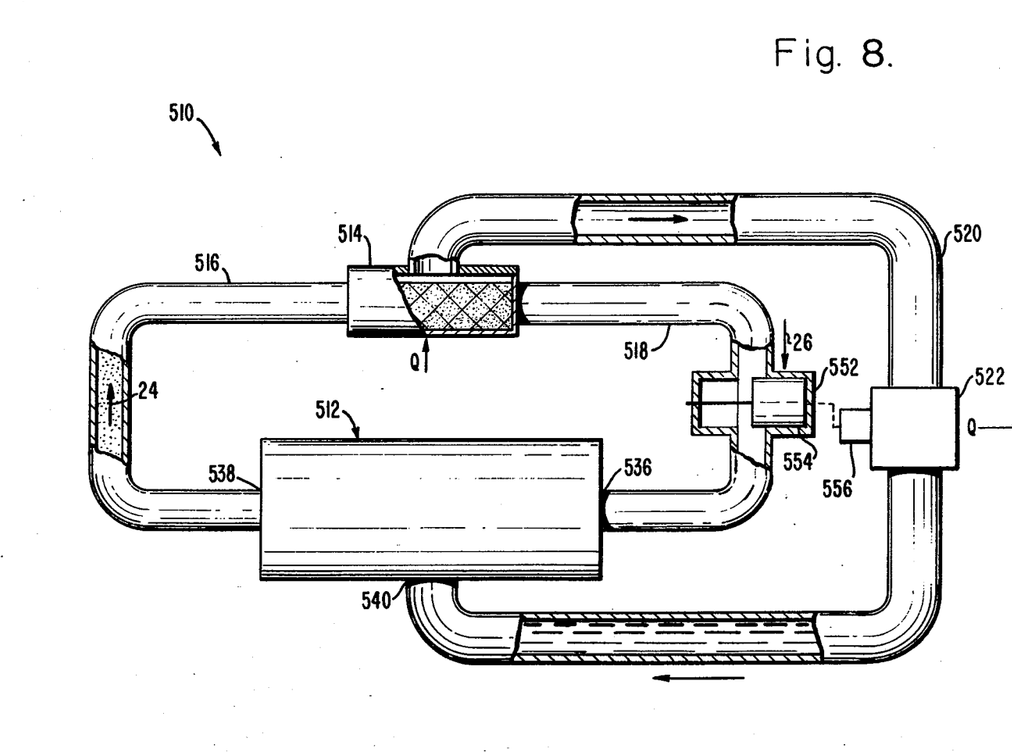

The arrangements of FIGS. 7 and 8 provide a feedback servo control to change the size of the openings within their respective valves 452 and 552. The operation of the valves is shown schematically by means of a blocking element 454 and 554 which are caused to move in and out of flow paths 418 and 518, respectively. Control of the movement of valve elements 454 and 554 is effected by a sensor 456 respectively coupled to evaporator 414 and condensor 522. Such sensors may comprise a fluid expansion thermostat. As the evaporator and condensor temperatures respectively increase or decrease, respective fluid expansion and contraction opens their valves 452 and 552 to increase the concentration gradient and the solution flow. Conversely, as the temperature decreases in evaporator 414 or increases in condenser 522, the temperatures respectively decrease and increase within evaporator 414 and condenser 522 to close valves 452 and 552 to reduce the concentration gradient and osmotic pumping.

Rather than providing for passive control, in the apparati of FIGS. 7 and 8, electrical control circuits may be set up to activate and deactivate flow control valves 452 and 552. It is to be understood, of course, that while sensors 456 and 556 are coupled to evaporator 414 and condenser 522, they may also be placed at any other remote location where control commands are desired to be generated.

Figure 9:
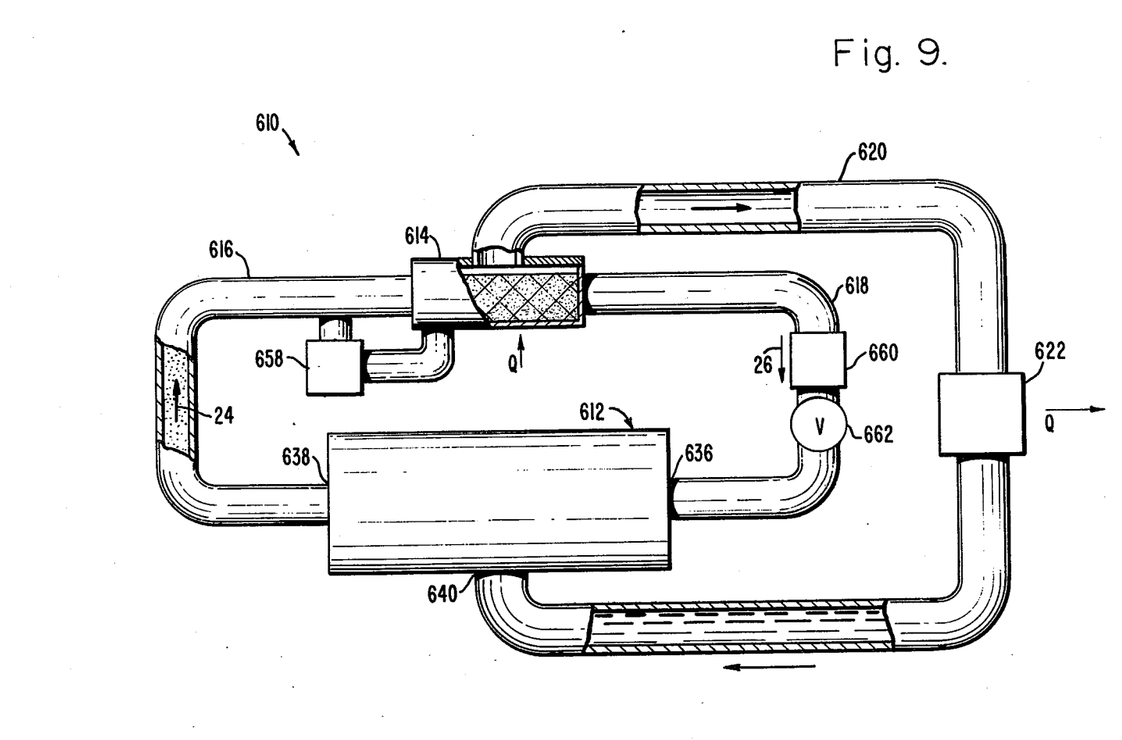

Referring to FIG. 9, to obtain instant response to load demand, reservoirs 658 and 660 may be coupled respectively in the lean and rich mixture solution paths 616 and 618. Reservoir 658 is placed in parallel with lean mixture solution path 616 and evaporator 614, while reservoir 660 is placed in series with a valve 662 in rich mixture solution path 618. In operation, at times of high heat load a larger amount of solution is pumped through osmotic pump 612 and this overload flows into access reservoir 658 and/or excess rich mixture solution is accommodated by access reservoir 660. Thus, an instant response to a load demand is obtained by preventing overload on the solution pumping system.

While evaporator 14 may be substantially free of interior material for use in 1-g applications, for 0-g and negative g applications, it is necessary that a wick material be placed therein as shown by indicium 62 in FIG. 1. In order to provide vapor from being entrapped within the evaporator, a space 64 is provided between evaporator 14 and inlet 66 of solvent vapor liquid path 20.

Although the invention has been described with reference to particular embodiments thereof, it should be realized that various changes and modifications may be made therein without departing from the spirit and scope of the invention.

What is claimed is:
1. An osmotically pumped heat pipe comprising solution and solvent reservoirs, an osmotic pump with solvent-permeable membrane material separating said res- ervoirs, an evaporator, a solvent vapor-liquid path coupled between said evaporator and said solvent reservoir, a condenser in said solvent vapor-liquid path, separate solution paths respectively carrying lean and rich mixtures of said solution and respectively coupled between said solution reservoir and said evaporator, and means associated with at least one of said solution paths capable of inducing a pressure in said rich solution mixture path which is higher than that which is in said lean solution mixture path.

2. A heat pipe according to claim 1 in which said separated solution paths comprise tubular conduits and said pressure inducing means comprises larger and smaller tube sizes respectively for said lean and rich mixture solution conduits.

3. A heat pipe according to claim 1 wherein said pressure inducing means comprises a valve in said rich mixture solution path.

4. A heat pipe according to claim 3 further comprising a valve opening and closing mechanism coupled to said valve and a sensor coupled to one of said evaporator and said condenser and to said valve mechanism for fully and partially opening and closing said valve.

5. A heat pipe according to claim 4 where said sensor comprises a fluid expansion thermostat in said evaporator for increased opening of said valve upon increase of the evaporator temperature and for increased closing of said valve upon decrease of the evaporator temperature.

6. A heat pipe according to claim 3 further including a reservoir coupled in parallel with said evaporator and said lean mixture solution path.

7. A heat pipe according to claims 3 or 6 further including a reservoir coupled in series with said valve in said rich mixture solution path.

8. A heat pipe according to claim 1 wherein said osmotic pump includes an enclosure enclosing said solution and solvent reservoirs and having inlets coupled respectively to said solvent vapor-liquid path and said rich mixture path and an outlet coupled to said lean mixture solution path, said solution paths inlet and outlet communicating directly with said solution reservoir, and said membrane material residing within one of said solution and solvent reservoirs.

9. A heat pipe according to claim 8 wherein said membrane material has a tubular configuration open to only one of said solvent reservoir and said solution reservoir and placed within said reservoir containing the other of said solvent and said solution.

10. A heat pipe according to claim 9
further including at least one plate having openings therein and supported by said enclosure essentially to form therewith said solution and solvent reservoirs, and
wherein said tubularly configured membrane material comprises a plurality of tubes equal in number to said openings and secured thereto at their tube ends.

11. A heat pipe according to claim 9
further including a pair of spaced plates, each having openings therein and each secured to and supported by said enclosure essentially to form therewith said reservoirs, and
wherein said tubularly configured membrane material comprises a plurality of tubes equal in number to said openings and secured thereto at their tube ends.

12. A heat pipe according to claim 11 wherein said enclosure comprises spaced end walls and a tubular wall joined to said end walls to form, with said spaced plates, a central chamber through which said tubes of membrane material extend and a pair of end chambers, and wherein said solution paths inlet and outlet are disposed in said end walls and said solvent vapor-liquid path is disposed in said tubular wall inbetween said spaced plates.

13. A heat pipe according to claim 9
wherein said enclosure comprises spaced end walls and a tubular wall joined to said end walls, and said tubularly configured membrane material comprises a plurality of tubes, and
further including a plate spaced from said end walls and secured to said tubular wall, said plate having openings therein equal in number to said tubes of membrane material, with said tubes at one of their ends secured to said plate at said openings and at the other of their ends to one of said end walls, and with said solvent vapor-liquid path in the other of said end walls and said solution paths in said tubular wall.

14. A heat pipe according to claim 9 wherein said membrane material comprises a closed space wound into a spiral configuration.

15. A heat pipe according to claim 14 wherein
said closed space is flat to impart a cylindrical shape to said spirally configured membrane material,
said enclosure comprises spaced end walls and a tubular wall joined to said end walls and shaped to conform to and to enclose said spirally configured, cyclindrical shaped membrane material,
said solvent path inlet is connected to said closed space to communicate with its interior, and
said solution paths inlet and outlet are connected to said end walls to enable flow of said rich mixture solution lengthwise of said cylindrically shaped membrane material in paths parallel to its axis past and in communication with the exterior of said closed space.

* * * * *